United States Patent [19]
Bartholmey et al.

[11] Patent Number: 6,051,261
[45] Date of Patent: Apr. 18, 2000

[54] STAGED JUICE FORTIFICATION PRODUCTS

[75] Inventors: Sandra J. Bartholmey, Crystal Lake, Ill.; Jay A. Burnett, Twin Lake; Reginald A. Berry, Muskegon, both of Mich.; Delfino Marin Mendoza; Carlos Flores Rivera, both of Queretaro, Mexico

[73] Assignee: Gerber Products Company, Fremont, Mich.

[21] Appl. No.: 09/036,149

[22] Filed: Mar. 6, 1998

Related U.S. Application Data

[60] Provisional application No. 60/039,999, Mar. 7, 1997.

[51] Int. Cl.⁷ .............................. A23L 1/302; A23L 1/304
[52] U.S. Cl. .............................. 426/72; 426/74; 426/599; 426/801
[58] Field of Search .................... 426/72, 74, 599, 426/801

[56] References Cited

U.S. PATENT DOCUMENTS

| | | | |
|---|---|---|---|
| 2,919,195 | 12/1959 | Block | 426/72 |
| 3,652,290 | 3/1972 | Hammes et al. | 426/72 |
| 3,734,742 | 5/1973 | Morse et al. | 426/72 |
| 4,753,926 | 6/1988 | Lucas et al. | 426/72 |
| 4,992,282 | 2/1991 | Mehansho et al. | 426/72 |

OTHER PUBLICATIONS

The Editors of Time Life Books. *Beverages,* Time–Life Books, Alexandria, VA, p. 121, 1983.

*Primary Examiner*—Helen Pratt
*Attorney, Agent, or Firm*—Price, Heneveld, Cooper, DeWitt & Litton

[57] ABSTRACT

A staged fortification system and a method of providing fortification on a staged basis to infants involves feeding an infant a Vitamin C fortified juice when the infant is from 3 to 6 months of age, feeding the infant a Vitamin C and iron fortified juice when the infant is from 6 to 9 months of age, feeding the infant a Vitamin C, iron and zinc fortified juice when the infant is from 9 to 12 months of age, and feeding the infant a Vitamin C, iron, zinc and calcium fortified juice when the infant is 1 year of age and older. The staged fortification system provides appropriate vitamins and minerals which are needed at particular stages in the development of an infant.

28 Claims, No Drawings

STAGED JUICE FORTIFICATION PRODUCTS

This application claims the benefit of U.S. provisional application below.

Ser. No. 60/039,999, filed on Mar. 7, 1997.

FIELD OF THE INVENTION

This invention relates to fortified nutritional products, and, more particularly, to vitamin and/or mineral fortified juice products.

BACKGROUND OF THE INVENTION

Fortified infant juice products have included Vitamin C, but have not included minerals, and, in particular, have not contained iron, zinc, calcium or combinations thereof. Heretofore, vitamin and mineral fortified nutritional products for infants have been limited to baby cereals. Although fortified baby cereal products are probably of some benefit, in most cases they are not likely to provide adequate amounts of Vitamin C and certain minerals on a sufficiently regular basis. It is generally well recognized that many vitamins and minerals can only provide a beneficial effect if taken regularly (i.e., at least on a daily basis), because of the body's tendency to rapidly deplete and eliminate such nutrients. In general, infants are not fed baby cereals on a sufficiently regular basis to provide adequate amounts of Vitamin C and certain minerals to achieve a desired beneficial effect. Accordingly, there is a need for a Vitamin C and/or mineral fortified nutritional product which can be fed to an infant on at least a daily basis.

A further disadvantage of relying on baby cereals to provide adequate amounts of Vitamin C and certain minerals is that the baby cereals typically contain a variety of vitamins and minerals which are not necessarily needed or beneficial to infants of all ages.

SUMMARY OF THE INVENTION

This invention concerns: 1) the provision of staged juice products which provide fortification of specific nutrients needed by infants at particular stages in their development; 2) a method of providing fortification on a staged basis to infants to deliver appropriate nutrients in biologically available form dependent upon the stage of development or age of the infant; 3) the provision of juice products, containing Vitamin C and iron, and which do not have an objectionable taste or appearance; 4) the provision of juice products containing calcium, in which the calcium is present in a biologically available form and is resistant to precipitation; and 5) the provision of a juice product in which Vitamin C, iron, zinc and calcium are all present in a highly biologically available form and in amounts sufficient to provide a desired beneficial effect when fed to an infant on a regular basis, and which does not have an objectionable taste or appearance, and wherein the calcium is not subject to precipitation.

The staged juice products of this invention comprise a Vitamin C fortified juice for babies 3 to 6 months of age; a Vitamin C and iron fortified juice for babies 6 to 9 months of age; a Vitamin C, iron and zinc fortified juice for babies 9 to 12 months of age; and a Vitamin C, iron, zinc and calcium fortified juice for children 1 year of age and older.

The Vitamin C and iron fortified juice products are prepared by adding ferrous gluconate and Vitamin C to the fruit and/or vegetable juices. The resulting juices, containing iron and gluconate ions in solution, do not have an appreciable ferrous taste, and are not appreciable darker than, or otherwise different in appearance from, similar juices which do not contain any added Vitamin C or added iron. The calcium fortified juice products are prepared by combining fruit and/or vegetable juice concentrate with yogurt to provide a juice product containing calcium in a form which will not be subject to precipitation.

These and other objects, advantages and features of the invention will be more fully understood and appreciated by reference to the Description of the Preferred Embodiments and the claims.

DESCRIPTION OF THE PREFERRED EMBODIMENTS

The expression "juice product" as used herein means a liquid nutritional product containing one or more vegetable and/or fruit juices or concentrates thereof. Specific examples include juices which are primarily comprised of at least one fruit or vegetable juice or juice concentrate, fruit or vegetable puree, and/or fruit or vegetable paste, and may include a quantity of water to reconstitute and/or dilute any concentrates, purees and/or paste to obtain a desired final taste, appearance, consistency and viscosity which is normally associated with fruit and/or vegetable juices. The juices may also contain fruit and/or vegetable essences or flavorings, other natural or artificial flavorings, sugar and/or other natural or artificial sweeteners in amounts needed to achieve a desired sweetness, citric acid or other suitable acidulants in amounts sufficient to adjust the juice to an appropriate pH (e.g., a maximum of about 4.1), as well as other conventional ingredients in amounts which do not effect the essential character of the juices, such as colorants, preservatives, emulsifiers, thixotropic agents, etc. Further, the juices of this invention are all fortified with Vitamin C, and are optionally fortified with iron; iron and zinc; or iron, zinc and calcium.

In addition, the expression "juice product" as used herein also encompasses liquid nutritional products which contain juices or concentrates thereof. The term "concentrates" is meant to encompass purees, paste and the like, as well as concentrates prepared by evaporating the water from natural fruit juices. A specific example of a juice product in accordance with this invention includes a juice or juice concentrate as defined above which is combined with yogurt. The yogurt contains calcium in a form which will not tend to precipitate from a juice product comprising the yogurt and the juice or juice concentrate. Vitamin C, iron, zinc and various combinations thereof can be added to the juice or juice concentrate before it is combined with the yogurt. Alternatively, Vitamin C, iron, zinc and various combinations thereof can be added to the yogurt and juice or juice concentrate combination, or to the yogurt before it is combined with the juice or juice concentrate.

Vitamin C is preferably added to the fortified juice products of this invention in the form of ascorbic acid. However, Vitamin C may also be added to the juice products in other suitable forms (such as in the form of salt of ascorbic acid) which do not introduce undesirable compounds or ions which will adversely effect the appearance, taste or other qualities of the juice product, and which are not susceptible to precipitation, and which do not render other nutrients or components in the juice products susceptible to precipitation.

The amount of Vitamin C which is added is preferably about the amount which will provide a juice product with a total Vitamin C content which is sufficient to meet about 100% of the recommended daily nutritional requirements for Vitamin C as determined by the government of the country or jurisdiction in which the product is to be sold. The amount of added Vitamin C which is needed to provide a single serving of juice products with 100% of the recommended daily nutritional requirement for Vitamin C as determined by the government of the jurisdiction in which it is to be sold is dependent upon the serving size and the natural Vitamin C content of the juice products prior to fortification with added Vitamin C. A typical serving size of a juice product for an infant is about 4 fluid ounces (about 118 milliliters). In general, when juices are prepared from juice concentrates and water, the amount of additional ascorbic acid which is needed to achieve 100% of the recommended daily nutritional requirement as determined by the government of the jurisdiction in which it is to be sold is from about 0.12 grains (about 0.10% by weight) to about 0.1 grams (about 0.13% by weight) for a 4 fluid ounce serving, depending on the amount of Vitamin C already present in the juices or juice concentrates used to prepare the juice product. Those familiar with the preparation of fortified foods and drinks can readily determine the amount of added Vitamin C which is needed to achieve a desired final Vitamin C content. Although, the juice products of this invention will preferably contain enough Vitamin C to provide 100% of the recommended daily nutritional requirement as determined by the government, higher or lower amounts of Vitamin C can be added if desired. However, all of the staged fortification juice products of this invention preferably contain about 100% of the recommended daily nutritional requirement of Vitamin C as determined by the government, because it is believed that substantially all infants, irrespective of their diet can benefit from regularly taking such amounts of Vitamin C, and that amounts of Vitamin C which are well in excess of 100% of the recommended daily nutritional requirement are not generally known or believed to have any detrimental effects on infants, and in fact may be beneficial.

First stage juices are fortified with Vitamin C only, and other vitamins and minerals are not added to supplement any amounts which are naturally present in the juice or juice concentrates used to prepare the first stage juice products.

The juice products which are intended to be fed to infants between the ages of 6 months and 9 months, in addition to containing added Vitamin C, are fortified with iron. Iron and Vitamin C are also added to the fortified juice products for infants between the ages of 9 months and 12 months along with zinc; and to the juice products for infants 12 months and older along with zinc and calcium. Iron is introduced into all staged fortified juice products for infants 6 months of age or older because it helps prevent anemia, which is the leading infant health problem around the world.

Iron is added to the second, third and fourth stage juice products in the form of ferrous gluconate, such as in an amount which will provide from about 10% to about 20% of the recommended daily nutritional requirement for iron as determined by the government of the jurisdiction in which it is to be sold. Ferrous gluconate provides iron at the prescribed levels in a highly biologically available form which does not have any significant adverse effects on the taste, color or other properties of the juice products. By providing iron at the 10% to 20% range of the recommended daily nutritional requirement, sufficient iron is provided to supplement other dietary intake of iron and to provide a beneficial result of helping to prevent anemia, yet the amount is not so high as to cause iron levels to become excessive if the infant is already getting sufficient iron in his/her diet.

For a typical 4 ounce (118 milliliter) serving of the juice products, approximately 0.9 to about 1.8 grams (about 0.008 to about 0.016% by weight) of ferrous gluconate are added to provide from about 10% to about 20% of the recommended daily nutritional requirement.

For the third and fourth stage juice products, for infants between the ages of 9 months to 12 months, and from 12 months and older, respectively, zinc is added in an amount to provide from about 10% to about 20% of the recommended daily nutritional requirement for zinc as determined by the government of the jurisdiction in which it is to be sold in a single serving size.

A suitable method of fortifying the third and fourth stage juice products with zinc is to add zinc sulfate. For a 4 ounce (118 milliliter) serving, from about 0.2 to about 0.4 grams (from about 0.018 to about 0.036% by weight) of zinc sulfate are added to obtain a juice product containing from about 10% to about 20% of the recommended daily nutritional requirement for zinc as determined by the government of the jurisdiction in which it is to be sold.

Zinc is added to the third and fourth stage products for infants over the age of 9 months to help maintain normal growth during this period when the supply of zinc can be deficient on account of the transition from formula to table foods.

Calcium is introduced in the fourth stage juice products because it helps build strong bones at a point in development when milk intake is often lower than during early infancy when babies receive usually enough calcium from the substantial amounts of breast milk, formula and/or cow milk in their diets.

The fourth stage juice products are fortified with calcium by adding yogurt to the juice or juice concentrates, water, and other conventional additives as needed to achieve a desired taste, appearance, and consistency, along with the Vitamin C, iron and zinc. The amount of yogurt which is added to the juice product is preferably an amount sufficient to obtain a juice product containing from about 10% to about 20% of the recommended daily nutritional requirement for calcium as determined by the government of the jurisdiction in which it is to be sold. Approximately 50 grams of yogurt in a 4 ounce (118 milliliter) serving size will provide a calcium content of about 10% of the recommended daily nutritional requirement for calcium as determined by the government of the jurisdiction in which it is to be sold.

By incorporating yogurt into the fourth stage juice products, calcium is introduced in a biologically available form which is not subject to precipitation, and which does not have any significant adverse effect on the taste, color, texture or appearance of the juice product.

While incorporation of yogurt into the fourth stage juice products represents a preferred method of fortifying a juice product with calcium, it will be appreciated by those skilled in the art that any of various alternative methods of fortifying a fruit or vegetable juice product with calcium may be used. Examples of such methods are disclosed for example in U.S. Pat. Nos. 2,325,360; 3,657,424; 4,722,847 and 4,919,963, in British Patent Specification 2,095,530 published Oct. 6, 1982, and in European Patent Application 75,114, published Mar. 30, 1983. These methods include adding calcium carbonate, calcium chlorides, calcium citrates, calcium phosphates, calcium acetate, calcium tartrate, calcium malate, calcium hydroxide, calcium lactate and the like or combinations thereof.

Although the juice products can be prepared from fresh fruit juices, they are in general prepared from various concentrates, purees, paste, etc. which are reconstituted and/or diluted with water. Examples of suitable fruit and vegetable juices and/or concentrates which can be used in the preparation of the staged fortified juice products include apple, pear, orange, pineapple, papaya, guava, mango, grape, prune, cherry, apricot, banana, peach, beet, tomato, and combination thereof.

The following examples illustrate specific embodiments of the invention, and should not be regarded as limiting the invention in any respect.

EXAMPLE 1

First Staged Juice Product

A 1,000 pound batch of a first staged apple juice product in accordance with this invention is prepared by combining 172 pounds of apple juice concentrate (71 Brix) with 821.9 pounds of water and mixing to form a slurry. Thereafter, 1.3 pounds of ascorbic acid is mixed into the slurry. The resulting Vitamin C fortified juice product may be pH adjusted and thereafter strained, pasteurized and packaged.

EXAMPLE 2

Stage 2 Tropical Fruit Juice 1,000 pounds of a stage 2 tropical fruit juice is prepared by combining 103.5 pounds of orange juice concentrate (64 Brix), 18.9 pounds of apple juice concentrate (71 Brix), 40.2 pounds of pineapple juice concentrate (60.5 Brix) and 774.9 pounds of water. The orange juice concentrate, apple juice concentrate, pineapple juice concentrate and water are mixed to form a slurry. To the slurry are added 34 pounds of papaya puree (14 Brix) and 15 pounds of guava puree (29 Brix), which are mixed with the water and concentrates. Thereafter, 12.2 pounds of granulated cane sugar are mixed into the slurry. In 5 liters of tap water, 1.2 pounds of ascorbic acid and 0.0821 pounds of ferrous gluconate are pre-dissolved, and subsequently mixed into the slurry. Thereafter, citric acid is added to adjust the pH. The resulting second stage tropical fruit juice is strained, pasteurized and packaged.

EXAMPLE 3

Third Stage Grape Juice Product

A 1,000 pound batch of a third stage grape juice concentrate fortified with Vitamin C, iron and zinc is prepared by mixing 232.8 pounds of grape juice concentrate with essence (68 Brix), 10.8 pounds of granulated cane sugar, 755.28 pounds of water, and a fortification premix consisting of 1.02 pounds of ascorbic acid, 0.0811 pounds of ferrous gluconate and 0.0184 pounds of zinc sulfate pre-dissolved in about 5 liters of water. The grape juice concentrate, sugar, water and fortification premix are mixed to form a slurry which is subsequently strained, pasteurized and packaged.

EXAMPLE 4

Fourth Stage Apple Juice Product

A 1,000 pound batch of a fourth stage apple juice product fortified with Vitamin C, iron, zinc and calcium is prepared by preparing a sugar solution containing 53.8 pounds of granulated cane sugar and 6.8 pounds of high methoxyl pectin, and a fortification premix containing 0.96 pounds of ascorbic acid, 0.0806 pounds of ferrous gluconate and 0.0183 pounds of zinc sulfate pre-dissolved in about 5 liters of water. To the pectin/sugar solution is added 448.5 pounds of plain, low-fat yogurt, 80 pounds of apple juice concentrate (71 Brix), and the fortification premix. The pectin/sugar solution, yogurt, apple juice concentrate, and fortification premix are thoroughly mixed to form a slurry. Thereafter, the pH is adjusted to a maximum of 4.1 by adding citric acid. The resulting product is strained, pasteurized and packaged.

It will be apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A staged fortification system comprising:
    a juice fortified with Vitamin C, but not fortified with iron, zinc or calcium, for babies 3 to 6 months of age;
    a juice fortified with Vitamin C and iron, but not fortified with zinc or calcium, for babies 6 to 9 months of age;
    a juice fortified with Vitamin C, iron and zinc, but not fortified with calcium, for babies 9 to 12 months of age; and
    a Vitamin C, iron, zinc and calcium fortified juice for children 1 year of age and older.

2. The staged fortification system of claim 1 in which the juices contain an amount of Vitamin C sufficient to provide 100% of the recommended daily nutrition requirement for Vitamin C as determined by the government of the jurisdiction in which it is to be sold.

3. The staged fortification system of claim 2, wherein the juices are fortified with iron by incorporating ferrous gluconate into the juices.

4. The staged fortification system of claim 3, wherein sufficient ferrous gluconate is incorporated into the juice products to provide from about 10% to about 20% of the recommended daily nutritional requirements of iron as determined by the government of the jurisdiction in which it is to be sold.

5. The staged fortification system of claim 3, wherein the zinc fortified juice is fortified by incorporating zinc sulfate into the juice.

6. The staged fortification system of claim 5, wherein zinc is incorporated into the zinc fortified juice at a level sufficient to provide from about 10% to about 20% of the recommended daily nutritional requirement of zinc as determined by the government of the jurisdiction in which it is to be sold.

7. The staged fortification system of claim 5, wherein the calcium fortified juice is fortified with calcium by incorporating yogurt into the calcium fortified juice.

8. The staged fortification system of claim 7, wherein the calcium fortified juice contains an amount of calcium sufficient to provide from about 10% to about 20% of the recommended daily nutritional requirement for calcium as determined by the government of the jurisdiction in which it is to be sold.

9. The staged fortification system of claim 7, wherein the calcium fortified juice contains an amount of calcium sufficient to provide from about 10% to about 20% of the recommended daily nutritional requirement for calcium as determined by the government of the jurisdiction in which it is to be sold.

10. The staged fortification system of claim 1, wherein the juices are fortified with iron by incorporating ferrous gluconate into the juices.

11. The staged fortification system of claim 10, wherein sufficient ferrous gluconate is incorporated into the juice products to provide from about 10% to about 20% of the recommended daily nutritional requirements of iron as determined by the government of the jurisdiction in which it is to be sold.

12. The staged fortification system of claim 1, wherein the zinc fortified juice is fortified by incorporating zinc sulfate into the juice.

13. The staged fortification system of claim 12, wherein zinc is incorporated into the zinc fortified juice at a level sufficient to provide from about 10% to about 20% of the recommended daily nutritional requirement of zinc as determined by the government of the jurisdiction in which it is to be sold.

14. The staged fortification system of claim 1, wherein the calcium fortified juice is fortified with calcium by incorporating yogurt into the calcium fortified juice.

15. A method of providing fortification on a staged basis to infants comprising:

feeding an infant a juice fortified with Vitamin C, but not fortified with iron, zinc or calcium, when the infant is from about 3 months to about 6 months of age;

feeding the infant a juice fortified with Vitamin C and iron, but not fortified with zinc or calcium, when the infant is from about 6 to about 9 months of age;

feeding the infant a juice fortified with Vitamin C, iron and zinc, but not fortified with calcium, when the infant is from about 9 to about 12 months of age; and feeding the infant a Vitamin C, iron, zinc and calcium fortified juice when the infant is from about 1 year of age and older.

16. The method of claim 15 in which the juices contain an amount of Vitamin C sufficient to provide 100% of the recommended daily nutrition requirement for Vitamin C as determined by the government of the jurisdiction in which it is to be sold.

17. The method of claim 16, wherein the juices are fortified with iron by incorporating ferrous gluconate into the juices.

18. The method of claim 17, wherein sufficient ferrous gluconate is incorporated into the juice products to provide from about 10% to about 20% of the recommended daily nutritional requirements of iron as determined by the government of the jurisdiction in which it is to be sold.

19. The method of claim 17, wherein the zinc fortified juice is fortified by incorporating zinc sulfate into the juice.

20. The method of claim 19, wherein zinc is incorporated into the zinc fortified juice at a level sufficient to provide from about 10% to about 20% of the recommended daily nutritional requirement of zinc as determined by the government of the jurisdiction in which it is to be sold.

21. The method of claim 19, wherein the calcium fortified juice is fortified with calcium by incorporating yogurt into the calcium fortified juice.

22. The method of claim 21, wherein the calcium fortified juice contains an amount of calcium sufficient to provide from about 10% to about 20% of the recommended daily nutritional requirement for calcium as determined by the government of the jurisdiction in which it is to be sold.

23. The method of claim 15, wherein the juices are fortified with iron by incorporating ferrous gluconate into the juices.

24. The method of claim 23, wherein sufficient ferrous gluconate is incorporated into the juice products to provide from about 10% to about 20% of the recommended daily nutritional requirements of iron as determined by the government of the jurisdiction in which it is to be sold.

25. The method of claim 15, wherein the zinc fortified juice is fortified by incorporating zinc sulfate into the juice.

26. The method of claim 25, wherein zinc is incorporated into the zinc fortified juice at a level sufficient to provide from about 10% to about 20% of the recommended daily nutritional requirement of zinc as determined by the government of the jurisdiction in which it is to be sold.

27. The method of claim 15, wherein the calcium fortified juice is fortified with calcium by incorporating yogurt into the calcium fortified juice.

28. The method of claim 27, wherein the calcium fortified juice contains an amount of calcium sufficient to provide from about 10% to about 20% of the recommended daily nutritional requirement for calcium as determined by the government of the jurisdiction in which it is to be sold.

* * * * *

UNITED STATES PATENT AND TRADEMARK OFFICE
CERTIFICATE OF CORRECTION

PATENT : 6,051,261
DATED : April 18, 2000
INVENTOR(S) : Sandra J. Bartholmey et al.

It is certified that error appears in the above-identified patent and that said Letters Patent is hereby corrected as shown below:

*Column 2, Line 1:

"appreciable" should be - -appreciably- -;

Column 3, Line 16:

"grains" should be - -grams- -;

Column 3, Line 17:

"0.1 grams" should be - -0.15 grams- -.

Signed and Sealed this

Twentieth Day of March, 2001

*Attest:*

NICHOLAS P. GODICI

*Attesting Officer*     *Acting Director of the United States Patent and Trademark Office*